United States Patent
Filippi et al.

(10) Patent No.: US 9,086,042 B2
(45) Date of Patent: Jul. 21, 2015

(54) VALVE BODY, FLUID INJECTION VALVE AND METHOD FOR PRODUCING A VALVE BODY

(71) Applicant: Continental Automotive GmbH, Hannover (DE)

(72) Inventors: Stefano Filippi, Castel' Anselmo Collesalvetti (IT); Mauro Grandi, Leghorn (IT); Francesco Lenzi, Leghorn (IT); Valerio Polidori, Leghorn (IT)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 78 days.

(21) Appl. No.: 14/077,361

(22) Filed: Nov. 12, 2013

(65) Prior Publication Data

US 2014/0166120 A1 Jun. 19, 2014

(30) Foreign Application Priority Data

Dec. 13, 2012 (EP) .................................... 12196957

(51) Int. Cl.
*F16K 29/00* (2006.01)
*F02M 51/06* (2006.01)
*F02M 61/16* (2006.01)
*F02M 65/00* (2006.01)

(52) U.S. Cl.
CPC ....... *F02M 51/0614* (2013.01); *F02M 51/0685* (2013.01); *F02M 61/166* (2013.01); *F02M 61/168* (2013.01); *F02M 65/005* (2013.01); *F16K 29/00* (2013.01); *F02M 2200/08* (2013.01); *F02M 2200/8046* (2013.01); *F02M 2200/9069* (2013.01); *F02M 2200/9092* (2013.01)

(58) Field of Classification Search
CPC .... F16K 27/00; F16K 29/00; F02M 51/0614; F02M 51/0685; F02M 61/166; F02M 61/168; F02M 65/005; F02M 2200/08; F02M 2200/8046; F02M 2200/9092; F02M 2200/9069
USPC ................................ 251/129.07, 129.15, 282
See application file for complete search history.

(56) References Cited

U.S. PATENT DOCUMENTS

| 4,601,458 | A | * | 7/1986 | Sheppard ................. 251/129.01 |
| 5,024,418 | A | * | 6/1991 | Reinicke et al. ......... 251/129.14 |
| 5,106,053 | A | * | 4/1992 | Miller et al. .................. 251/282 |
| 5,402,093 | A | * | 3/1995 | Gibas et al. ............. 251/129.15 |
| 7,418,931 | B2 | * | 9/2008 | Sugie et al. .............. 251/129.07 |

(Continued)

FOREIGN PATENT DOCUMENTS

| EP | 1055812 A2 | 11/2000 | ............. F02M 21/02 |
| WO | 2011/076535 A1 | 6/2011 | ............. F02M 51/06 |

OTHER PUBLICATIONS

European Search Report, Application No. 12196957.0, 4 pages, Apr. 19, 2013.

*Primary Examiner* — John Bastianelli
(74) *Attorney, Agent, or Firm* — Slayden Grubert Beard PLLC

(57) ABSTRACT

A valve body for a fluid injection valve has a longitudinal axis and includes a base body. The base body has a sidewall defining a recess extending through the base body in an axial direction. The sidewall includes a magnetic material and has at least one opening that perforates the sidewall. The valve body further includes a cover element which includes a non-magnetic material and which is arranged to sealingly cover at least one opening. In addition a fluid injection valve and a method for producing the valve body are disclosed.

16 Claims, 3 Drawing Sheets

(56) References Cited

U.S. PATENT DOCUMENTS

| | | | |
|---|---|---|---|
| 7,973,627 B2* | 7/2011 | Yamagata et al. | 251/129.15 |
| 2003/0116739 A1* | 6/2003 | Murao et al. | 251/129.15 |
| 2006/0028311 A1 | 2/2006 | Burger et al. | 335/229 |
| 2008/0237520 A1 | 10/2008 | Sugiyama et al. | 251/129.21 |
| 2009/0127354 A1 | 5/2009 | Matsusaka et al. | 239/585.1 |
| 2009/0200405 A1 | 8/2009 | Yoshimaru et al. | 239/585.1 |
| 2011/0001073 A1* | 1/2011 | Ogawa et al. | 251/129.15 |
| 2012/0325939 A1 | 12/2012 | Graner et al. | 239/585.5 |

* cited by examiner

VALVE BODY, FLUID INJECTION VALVE AND METHOD FOR PRODUCING A VALVE BODY

CROSS-REFERENCE TO RELATED APPLICATIONS

This application claims priority to EP Patent Application No. 12196957 filed Dec. 13, 2012. The contents of which are incorporated herein by reference in their entirety.

TECHNICAL FIELD

The present disclosure relates to a valve body for a fluid injection valve, to a fluid injection valve and to a method for producing a valve body for a fluid injection valve.

SUMMARY

One embodiment provides a valve body for a fluid injection valve, the valve body having a longitudinal axis and comprising a base body, the base body having a sidewall defining a recess extending through the base body in axial direction, wherein the sidewall comprises a magnetic material and has at least one opening which perforates the sidewall, and the valve body comprises a cover element which comprises a non-magnetic material and is arranged to sealingly cover at least one opening.

In a further embodiment, the cover element extends completely circumferentially around the base body.

In a further embodiment, the cover element at least partially fills the at least one opening.

In a further embodiment, the base body comprises a ferritic steel and/or the cover element comprises an austenitic steel.

In a further embodiment, the valve body has mirror symmetry with respect to a mirror plane comprising the longitudinal axis or has an n-fold rotational symmetry with respect to the longitudinal axis.

Another embodiment provides a fluid injection valve comprising a valve body as disclosed above and an electromagnetic actuator assembly, wherein the electromagnetic actuator assembly comprises an armature arranged in the recess and axially overlaps with the at least one opening.

Another embodiment provides a method for producing a valve body for a fluid injection valve having a longitudinal axis, the method comprising: producing a base body comprising a magnetic material, so that the base body has a sidewall defining a recess, the recess extending through the base body in axial direction, wherein the side wall has at least one opening, and producing a cover element comprising a non-magnetic material and arranging the cover element to sealingly cover the at least one opening.

In a further embodiment, producing the cover element comprises providing a mold and a mixture of the non-magnetic material with a binder, injecting the mixture into the mold for forming the cover element, and sintering the cover element.

In a further embodiment, the base body is arranged in the mold before the mixture is injected.

In a further embodiment, a composite green body is produced which comprises the base body and the cover element, and said composite green body is sintered.

In a further embodiment, producing the composite green body comprises providing a first mold part, providing a second mold part and a first mixture, the first mixture comprising the magnetic material and a binder, assembling a first mold comprising the first mold part and the second mold part and injecting the first mixture into the first mold for forming the base body, providing a third mold part and a second mixture, the second mixture comprising the non-magnetic material and a binder, and assembling a second mold comprising the first mold part and the third mold part and injecting the second mixture into the second mold for forming and arranging the cover element.

In a further embodiment, the base body is positioned in the second mold before the second mixture is injected.

BRIEF DESCRIPTION OF THE DRAWINGS

Example embodiments are described in detail below with reference to figures, in which.

DETAILED DESCRIPTION

Figure 1:
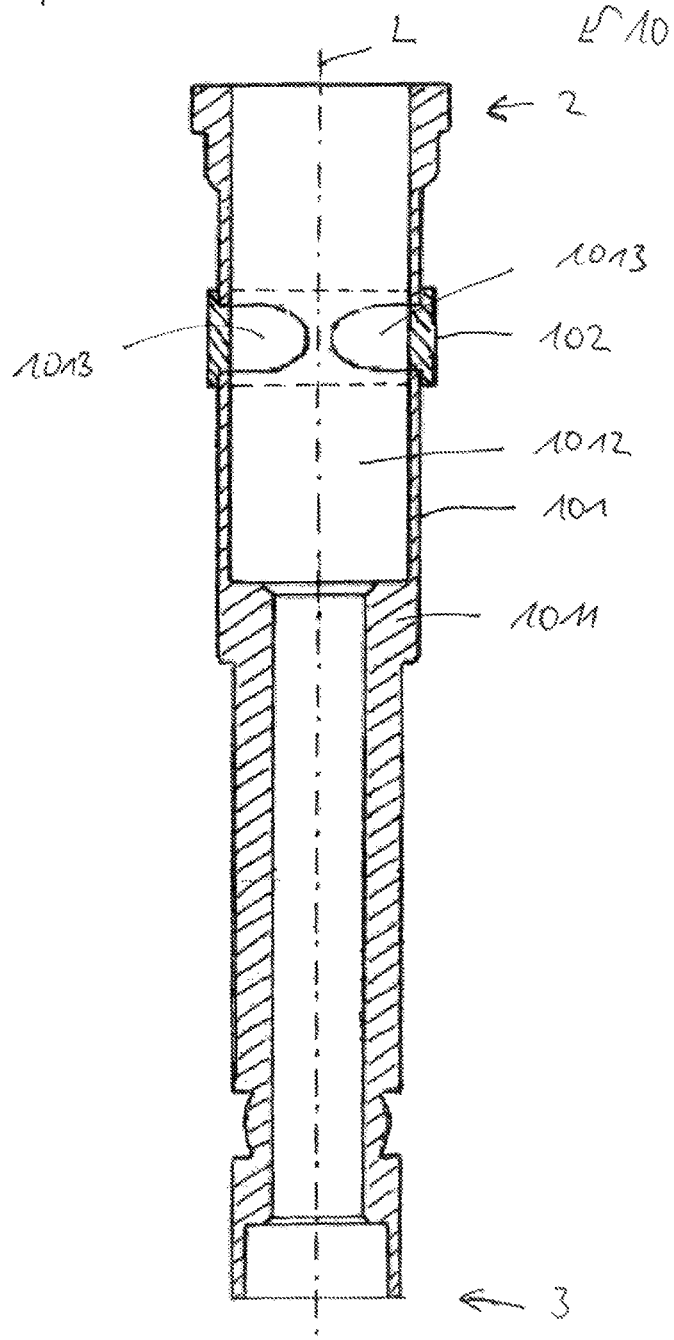
FIG. 1 shows an exemplary embodiment of a valve body in a schematic cross-sectional view.

Various embodiments of the present invention provide a valve body for a fluid injection valve which has particularly good magnetic properties.

According to one embodiment, a valve body for a fluid injection valve is specified. According to another embodiment, a fluid injection valve comprising the valve body is specified.

The fluid injection valve is in particular a fuel injection valve, for example for an internal combustion engine. In the case of a gasoline engine, the fluid injection valve may be configured for operating at fluid pressures up to 200 bar or more, for example up to 500 bar. In the case of a diesel engine, the fluid pressure may be in the range of 2000 bar or more under operating conditions of the fluid injection valve. The fluid injection valve may be arranged to dose fuel into an intake manifold of the internal combustion engine or directly into the combustion chamber of a cylinder of the internal combustion engine.

The fluid injection valve may comprise a valve needle and a valve seat. The valve seat may, for example, be in one piece with the valve body or it may be rigidly coupled to the valve body. The valve seat preferably comprises at least one injection nozzle. The fluid injection valve is in particular configured to dispense fluid through the injection nozzle. In an expedient embodiment, the valve needle is configured to interact with the valve seat in such fashion that the valve needle prevents fluid flow through the injection nozzle in a closing position and releases fluid flow through the injection nozzle in further positions.

The fluid injection valve may expediently comprise an electromagnetic actuator assembly. The electromagnetic actuator assembly in particular has an armature which mechanically interacts with the valve needle for moving the valve needle. The armature is in particular operable for moving the valve needle away from the closing position when the actuator assembly is energized.

The valve body has a longitudinal axis. It comprises a base body and a cover element.

The base body has a sidewall. The sidewall defines a recess. In particular, the sidewall has an inner surface which delimits the recess at least laterally and an outer surface facing away from the recess. The recess extends through the base body in axial direction. The valve needle is in particular arranged in the recess. The armature may be arranged in the recess, as well.

The sidewall has at least one opening which perforates the sidewall. The opening may also be called a cut-out or an aperture. The opening may in particular extend through the sidewall in radial direction. For example, the opening extends completely through the sidewall perpendicularly or obliquely to the longitudinal axis, preferably from the outer surface to the inner surface of the sidewall.

In one embodiment, the armature axially overlaps with the at least one opening. In other words, the armature and the at least one opening overlap in a side view—i.e. in particular a view along a radial direction, perpendicular to the longitudinal axis—of the valve body.

The cover element is arranged to sealingly cover the at least one opening. For example, in a side view of the valve body, the cover element completely overlaps the opening. In one development, the cover element contacts an edge—which may in particular be a circumferential edge—of the opening. In another development, the cover element additionally or alternatively projects beyond the edge of the opening so that it in particular contacts the outer surface of the side wall.

The base body, or at least the sidewall, comprises a magnetic material. The cover element comprises a non-magnetic material. Preferably, the base body consists of the magnetic material and/or the cover element consists of the non-magnetic material.

By means of the opening or openings in the magnetic valve body which are covered with the non-magnetic cover element, the portion of the magnetic flux which bypasses the armature through the valve body is particularly small.

In this way, a particularly good dynamic behavior of the fluid injection valve is achievable. Thus, the fluid injection valve may be operable to dispense particularly small fluid doses. The dosage may also be particularly precise.

In addition, the position of the armature within the valve body can be detected particularly precisely with the valve body according to the present disclosure. This is particularly important for operating the fuel injection valve under so-called "ballistic" operating conditions, where the closing event of the fuel injection valve is initiated before it can come to rest in an opened configuration.

For example, the induction signal which is generated in a coil of the electromagnetic actuator assembly due to changes of the velocity of the armature is particularly strong when the fluid injection valve has the valve body according one of the preceding embodiments or developments. The risk that the induction signal may be disturbed by fluctuations in the magnetic valve body is particularly low. In this way, for example the velocity changes of the armature at the end of its axial travel during the opening event and/or the closing event can be detected particularly precisely.

In one embodiment, the base body comprises a ferritic steel. A ferritic steel may comprise the following elements: Cr, C, Mn, Si, P, and S. Additionally, it may comprise Ni or Mo. In one development, it comprises 16-18% of Cr, 0.75% or less of Ni, 0.12% or less of C, 1% or less of Mn, 1% or less of Si, 0.04% or less of P and 0.03% or less of S. For example the ferritic steel may be a steel having the SAE designation 430.

In another embodiment, the cover element comprises an austenitic steel. An austenitic steel may comprise the following elements: Cr, C, Ni, and Fe. Additionally, it may comprise at least one of the following elements: Mn, P, S, Si. In one development, it comprises 18-20% of Cr, 0.08% or less of C, 8-10.5% of Ni, 66.345-74% of Fe, 2% or less of Mn, 1% or less of Si, 0.045% or less of P and 0.03% or less of S. For example the austenitic steel may be a steel having the SAE designation 304.

In yet another embodiment, the cover element extends completely circumferentially around the base body. In particular, the cover element has the shape of a ring, the ring extending around the sidewall and in particular contacting the outer surface of the sidewall.

In one embodiment, the cover element at least partially fills the at least one opening. For example the ring has at least one radially inward facing protrusion which is arranged in the opening. For example, the protrusion and the opening are congruent.

The cover element which extends completely circumferentially around the base body and/or at least partially fills the at least one opening allows for a particularly reliable sealing of the valve body against leakage of the fluid to the outside through the at least one opening.

In one embodiment, the valve body has mirror symmetry with respect to a mirror plane comprising the longitudinal axis. In another embodiment, the valve body also has an n-fold rotational symmetry with respect to the longitudinal axis. In particular, the letter n stands for a natural number in this case and preferably has a value between 3 and 10, where the limits are included. An "n-fold rotational symmetry" means that the valve body is transformed into itself by a rotation of 360°/n or a multiple thereof, but is not rotation-invariant with respect to rotation around the longitudinal access by an arbitrary angle.

A valve body having such a symmetry is particularly advantageous with respect to its magnetic properties. It may allow a particular precise detection of the armature position.

According to a further aspect, a method for producing the valve body is specified. The method may comprise producing the base body and producing the cover element.

In one embodiment of the method, producing the cover element comprises providing a mold. It further comprises providing a mixture of the non-magnetic material with a binder. According to one method step, the mixture is injected into the mold for forming the cover element. Subsequently, the cover element is sintered.

In one development, the base body is produced and arranged in the mold before the mixture is injected into the mold for forming the cover element. In this development, the base body may be produced by machining, for example. The mold may comprise a core which is inserted in the recess of the base body in one development.

In another embodiment, the method comprises forming a composite green body which comprises the base body and the cover element and subsequent sintering of the composite green body. A particularly tight connection between the base body and the cover element is achievable in this way, so that the risk of fluid leakage out of the valve body in the region of the at least one opening is particularly low.

The expression "green body" in this case is a technical term in the technical fields of sintering and metal injection molding which is known to the person skilled in the art. It designates the molded workpiece in its unsintered state, in particular still containing the binder. It is not necessary for a green body in the present context to have a green color. That the green body is "composite", means that it comprises two portions of different composition—specifically the base body with the magnetic material and the cover element with the non-magnetic material.

In one development, forming the composite green body comprises providing a first mold part, a second mold part and third mold part. In addition, a first mixture and a second mixture are provided. The first mixture comprises the magnetic material and a binder, while the second mixture comprises the non-magnetic material and a binder.

A first mold is assembled which comprises the first mold part and the second mold part. The first mixture is injected into the first mold for forming the base body. Previously or subsequently, a second mold is assembled which comprises the first mold part and the third mold part. The second mixture is injected into the second mold for forming the cover element and arranging the cover element to cover the at least one opening.

The first and/or the second mold may comprise one or more additional pieces—such as a core and/or one or more inserts—in addition to the first mold part and the second or third mold part, respectively, for shaping a cavity having the inverse shape of the base body and the cover element, respectively.

In one development of the method, the base body is arranged in the second mold before the second mixture is injected. For example if the base body is formed before forming the cover element, the base body may remain in the first mold part while the second mold is assembled and the cover element is formed. In this case, the cover element is arranged to cover the at least one opening by means of injecting the second mixture into the second mold.

In an alternative development, the cover element is arranged in the first mold before the first mixture is injected. For example if the cover element is formed prior to forming the base body, the cover element may remain in the first mold part during assembling the first mold and forming the base part. In this case, the cover element is arranged to cover the at least one opening by means of its positioning in the first mold and it covers the opening as soon as the base body is formed by injecting the first mixture into the first mold.

The positioning of the cover element relative to the base body may be particularly precise in these developments. The risk of damaging the firstly manufactured part is particularly low.

When the magnetic material and the non-magnetic material, respectively, are provided for producing the respective mixture, they may be provided in the form of a powder. Together with the binder, a slurry or gel may be produced, which represents the respective mixture. The binder may be wax based, such as a paraffin binder, or water based, such as agar, for example.

From the green body which is formed by means of injecting the respective mixture or mixtures in the mold(s), the binder may be subsequently removed at least partially, resulting in a so-called brown body. During the subsequent sintering process of the cover element or the composite green body, rigid connections between the individual grains of the powder or powders may establish, for example by melting of surface regions of the grains.

FIG. 1 shows a schematic cross-sectional view of a valve body 10 according to an exemplary embodiment. The valve body 10 has a longitudinal axis L and extends along the longitudinal axis L from a fluid inlet portion 2 to a fluid outlet portion 3.

The valve body 10 has a base body 101. The base body 101 has a sidewall 1011. The sidewall 1011 extends circumferentially around the longitudinal axis L and defines a recess 1012. The recess 1012 extends from the fluid inlet portion 2 to the fluid outlet portion 3 through the valve body 10. In the present embodiment, the recess 1012 is laterally delimited by an inner surface of the sidewall 1011. An outer surface of the sidewall 1011 faces away from the recess 1012.

The base body 10 may have a first portion in which the sidewall 1011 as first inner diameter and a first outer diameter and a second portion, downstream of the first portion, wherein the sidewall 1011 has a second inner diameter which is smaller than the first inner diameter. In the second portion, the sidewall 1011 may have a second outer diameter which is smaller than the first outer diameter. In an interface region between the first and second portions of the valve body, the recess 1012 may have a step. In one development, the valve body has a third portion downstream of the second portion, the sidewall 1011 having a third inner diameter in the third portion, wherein the third inner diameter is larger than the second inner diameter.

The sidewall 1011 of the base body 101 of the valve body 10 is perforated by two openings 1013 in the present embodiment. The openings are, in the present embodiment, arranged in mirror-symmetrical fashion with respect to a mirror plane comprising the longitudinal axis L and in particular extending perpendicularly to the image plane of FIG. 1. The openings are, in other words, radially extending holes in the base body 101, extending from the outer surface of the sidewall 1011 to the inner surface of the sidewall 1011. The openings 1013 are in particular arranged in the first portion of the base body 101.

The valve body 10 further comprises a cover element 102. The cover element 102 is arranged to cover the openings 1013 in the sidewall 1011 of the base body 101. Expediently, the cover element 102 is arranged on the outer surface of the sidewall 1011 and radially extends into the openings 1013. In other words, the cover element 102 has radially inwardly facing protrusions which are received in the openings 1013. The cover element 102 extends completely circumferentially around the base body 101 in a ring shaped fashion.

The base body 101 consists of a ferritic steel, for example SAE 430 steel, which is a magnetic material. The cover element consists of an austenitic steel, for example SAE 304 steel, which is a non-magnetic material.

Figure 2:
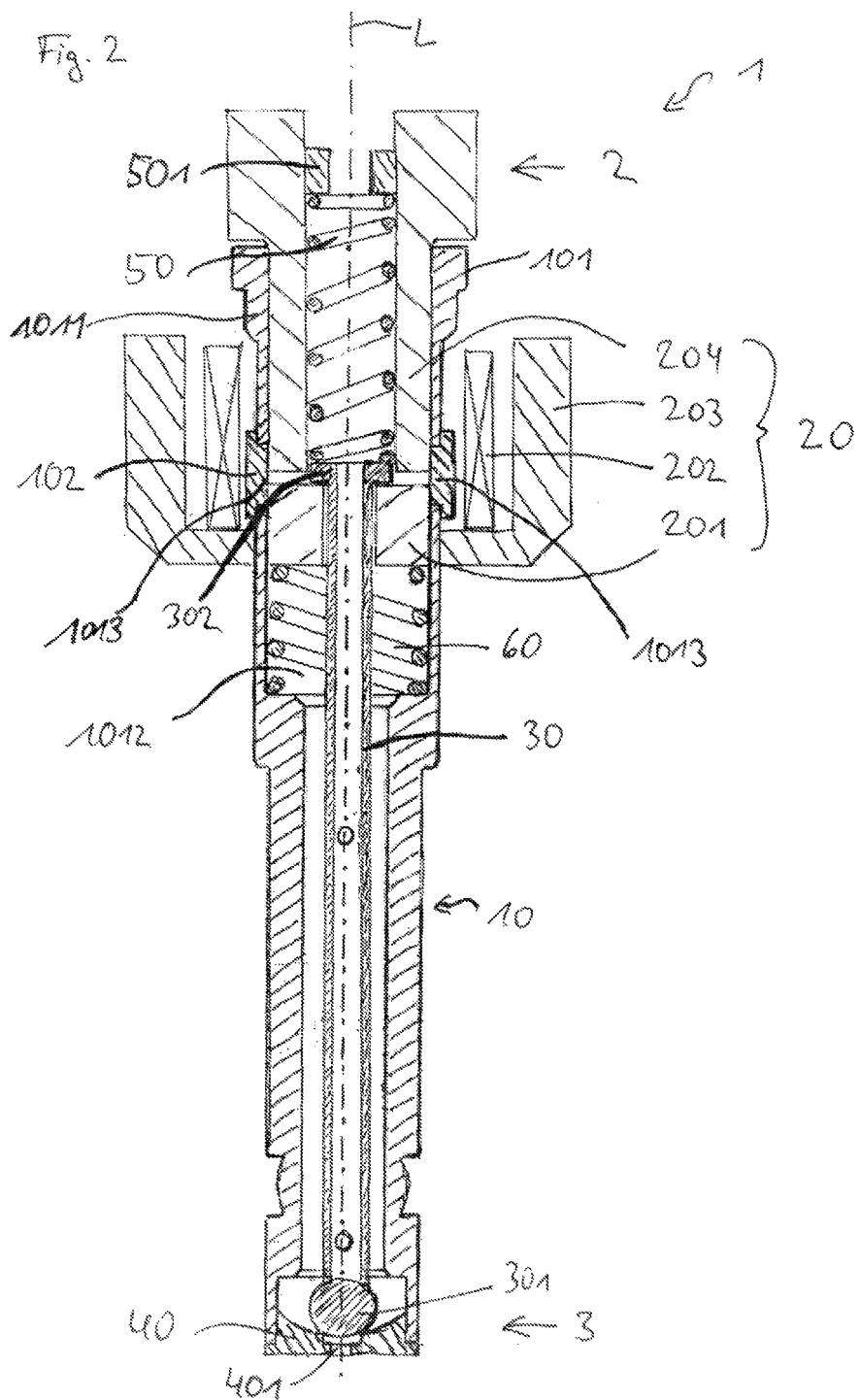
FIG. 2 shows an exemplary embodiment of a fluid injection valve according to an exemplary embodiment in a schematic cross-sectional view.

FIG. 2 shows a schematic cross-sectional view of an injection valve 1 according to an exemplary embodiment.

The injection valve 1 comprises the valve body 10 according to the exemplary embodiment described above in connection with FIG. 1. Further, the injection valve 1 comprises an actuator assembly 20. The actuator assembly 20 comprises an armature 201 which is arranged in the recess 1012 of the valve body 10. It further comprises a coil 202 extending circumferentially around the valve body 10. It further comprises a housing 203 and a pole piece 204 for establishing a magnetic circuit.

In addition, the fluid injection valve 1 comprises a valve needle 30 which has a main extension direction along the longitudinal axis L and is arranged in the recess 1012. The valve needle 30 has a tip 301—shaped as a ball in the present embodiment—and a flange 302, sometimes also called a collar. The tip 301 is facing towards the fluid outlet portion 3 and the flange 302 is facing towards the fluid inlet portion 2 of the valve body 10.

In addition, the fluid injection valve 1 comprises a valve seat 40 which is in a fixed position with respect to the valve body 10. In particular, the valve seat 40 closes a fluid outlet end 3 of the valve body 10, only leaving a nozzle 401 open. The valve needle 30 is expediently operable to interact with the valve seat 40 to prevent fluid flow through the nozzle 401 when the valve needle is in a closing position and releasing fluid flow from the fluid inlet portion 2 through the recess 1012 to the fluid outlet portion 3 and through the nozzle 401 in further positions.

The fluid injection valve 1 has a main spring 50 one end of which is coupled to a spring seat 501 which is positionally fixed with respect to the valve body 10. An opposite end of the main spring 50 bears on the collar 302 of the valve needle 30 for biasing the valve needle 30 towards the valve seat 40 in order to retain the fluid injection valve 1 in a closed configuration when the actuator assembly is de-energized.

The valve needle 30 extends though a central opening of the armature 201 in such fashion that the armature 201 is axially moveable with respect to the valve needle 20. In the direction towards the fluid inlet opening 2, the axial movement of the armature 201 with respect to the valve needle 30 is limited by the collar 302.

The fluid injection valve 1 comprises an armature spring 60 which mechanically interacts with the valve body 10 and the armature 201 to bias the armature 201 towards the collar 302 of the valve needle 30. The elastic force transferred to the valve needle 30 by the armature spring 60 via interaction with the armature 201 and the collar 302 is smaller than the spring load on the valve needle 30 in direction towards the valve seat 40 which is exerted on the valve needle 30 by the main spring 50, so that the valve retains the closed configuration when the actuator assembly 20 is de-energized.

The electromagnetic actuator assembly 20 is configured for moving the valve needle 30 away from the closing position—i.e. in axial direction towards the fluid inlet portion 2—against the force of the main spring 50. The pole piece 204 is received in the recess 1012 of the base body 101 and rigidly coupled to the latter so that the pole piece 204 and the valve body 10 are positionally fix with respect to each other. The pole piece 204 is positioned such that the armature 201 is axially distanced from the pole piece 204 when the valve needle 30 is in the closing position. When the coil 202 is energized for moving the valve needle 330 out of the closing position, a magnetic force is exerted on the armature 201 which moves the armature 201 towards the pole piece 204, thereby reducing the axial gap between the armature 201 and the pole piece 204. The fluid injection valve 1 may be configured to reach its opened state when the armature 201 is in direct mechanical contact with the pole piece 204.

The openings 1013 in the base body 101 of the valve body 10 axially overlap with the armature 201. In other words, the armature 201—or at least a portion of the armature 201—and the cover element 102—or at least a portion of the cover element 102—share the same positions with respect to the longitudinal axis L. In this way, there is a particular small amount of magnetic material between the armature 201 and the coil 202. Therefore, velocity changes of the armature 201 produce a particularly high induction signal in the coil 202. Thus, the position of the armature 201 is particularly precisely detectable.

Figure 3:
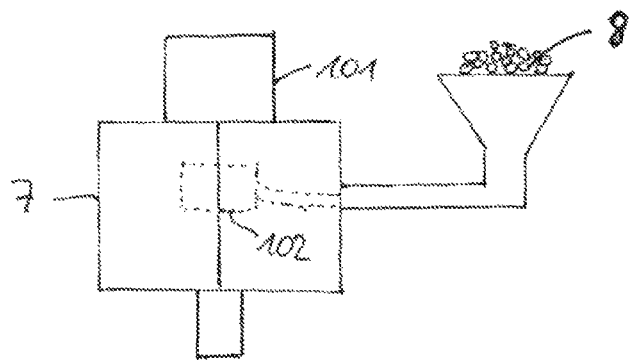
FIG. 3 shows one method step of a first method for producing the valve body according to the embodiment of FIG. 1 in a schematic side view.

FIG. 3 shows a first embodiment of a method for producing the valve body 10 according to the exemplary embodiment described in connection with FIG. 1 above in a schematic side view during one step of the method.

In the method according to the first embodiment, the base body 101 of the valve body 10 is produced. I one development, producing the base body comprises machining, casting or injection molding the base body 101.

Subsequently, the base body is positioned in a mold 7. The mold may expediently provide a cavity having the inverse shape of the cover element as roughly indicated by the dashed lines in FIG. 3.

A mixture 8 of a non-magnetic material and a binder is provided. Subsequently, the mixture 8 is injected in to the mold 7 for forming the cover element. Injecting the mixture 8 into the mold 7 may comprise heating the mixture for melting the binder. Such metal injection molding processes are in principle known to the person skilled in the art and, therefore, are not described in greater detail here.

By means of the shape of the mold 7 and the arrangement of the base body 101 in the mold, the cover element 102 sealingly covers the openings 1013 in the base body 101 when the mixture 8 is injected in the mold 7.

Subsequently, the mold 7 is removed from the composite formed by the base body 101 and the cover element 102. Then, the binder may be removed from the cover element 102, leaving behind the non-magnetic material. The cover element 102—in particular the composite formed by the base body 101 and the cover element 102—is sintered. The sintering step can take place subsequently to removing the binder or sintering and removing the binder from the cover element 102 can be performed in one process.

With advantage, the mechanical stability of the cover element 102 is improved by means of sintering. In particular, the non-magnetic material is used in form of a powder for producing the mixture 8. In the mixture 8, the grains of the powder may form a slurry together with the binder. By means of sintering the cover element 102, rigid connections between the grains may form, for example due to melting of surface regions of the grains. In this way, the sintering step may also contribute to a particular good contact between the cover element 102 and the base body 101 so that a particularly tight sealing of the openings 1013 is achievable.

Figure 4A:
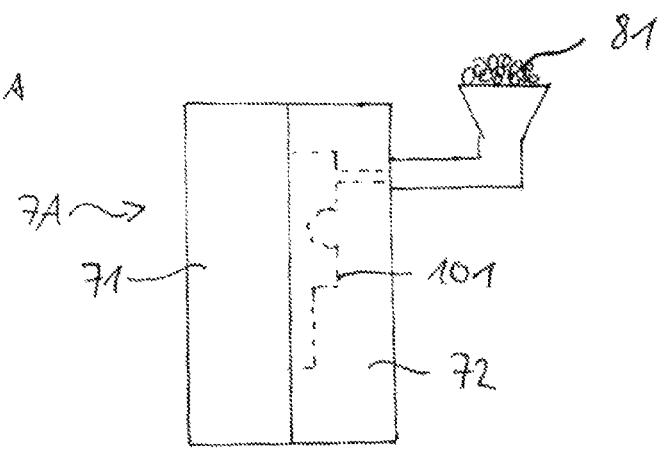
FIG. 4a shows a first method step of a second exemplary embodiment of a method for producing the valve body according to the embodiment of FIG. 1 in a schematic side view, and FIG. 4b a second method step of the second exemplary embodiment of the method in a schematic side view.
Figure 4B:
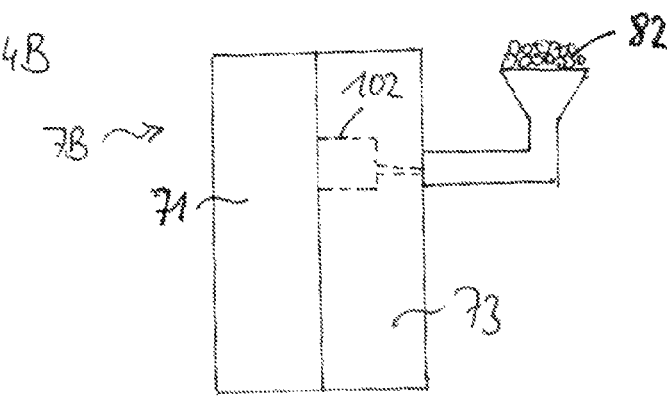

FIGS. 4A and 4B show a second exemplary embodiment of a method for producing the valve body 10 in schematic side views during two subsequent method steps.

In the method according to the second exemplary embodiment, a first mold part 71 is provided. A first mold 7A is assembled using the first mold part 71 and a second mold part 72 (see FIG. 4A). Further pieces such as a core and/or one or more inserts (not shown in the figures) may additionally be used for assembling the first mold 7A.

A first mixture 81 is provided comprising a magnetic material and a binder. The first mold 7A may have a cavity having the inverse shape of the base body 101 as indicated by the dashed lines in the second mold part 72 in FIG. 4A. The first mixture 81 is injected into the cavity of the first mold 7A for forming the base body 101. At the end of this method step, the base body 101 is in the state of a so called green body, i.e. it is an unsintered workpiece comprising the magnetic material and the binder.

Subsequently, the second mold part 72 is removed. A second mold 7B is assembled using the first mold part 71 and a third mold part 73. Further pieces such as a core and/or one or more inserts (not shown in the figures) may be additionally used for assembling the second mold 7B.

The base body is arranged in the second mold 7B. Preferably, the base body 101 remains in the first mold part 71 during the disassembly of the first mold 7A and the assembly of the second mold 7B. In this way, the risk of damaging the base body 101 may be particularly low.

The second mold 7B may have a cavity having the inverse shape of the cover element 102 as indicated by the dashed lines in the third mold part 73 in FIG. 4B. A second mixture 82 is provided comprising a non-magnetic material and a binder and is injected into the cavity of the second mold 7B.

In this way, a composite green body comprising the base body 101 and the cover element 102 is produced. Subsequently, the binder may be removed from the composite green part. The composite green body is sintered, preferably subsequently to removal of the binder. Producing the composite green body and simultaneous sintering of the base body 101 and the cover element 102 are particularly advantageous for ensuring a fluid-tight connection between the base body 101 and the cover element 102 at the edges of the openings 1013.

The invention is not restricted to the exemplary embodiments by the description in connection with these embodiments. Rather, it comprises any combination of elements of different embodiments. Moreover, the invention comprises any combination of claims and any combination of features disclosed by the claims.

What is claimed is:

1. A method for producing a valve body for a fluid injection valve having a longitudinal axis, the method comprising:
   producing a base body comprising a magnetic material, the base body having a sidewall defining a recess extending through the base body in an axial direction, the sidewall having at least one opening that opens into the recess,
   producing a cover element comprising a non-magnetic material, and
   arranging the cover element to sealingly cover the at least one opening in the base body sidewall.

2. The method of claim 1, wherein producing the cover element comprises:
   providing a mold and a mixture of the non-magnetic material with a binder,
   injecting the mixture into the mold to form the cover element, and
   sintering the cover element.

3. The method of claim 2, wherein the base body is arranged in the mold before the mixture is injected.

4. The method of claim 1, comprising producing a composite green body comprising the base body and the cover element, and sintering said composite green body.

5. The method of claim 4, wherein producing the composite green body comprises:
   providing a first mold part,
   providing a second mold part and a first mixture, the first mixture comprising the magnetic material and a binder,
   assembling a first mold comprising the first mold part and the second mold part and injecting the first mixture into the first mold for forming the base body,
   providing a third mold part and a second mixture, the second mixture comprising the non-magnetic material and a binder, and
   assembling a second mold comprising the first mold part and the third mold part, and injecting the second mixture into the second mold to form and arrange the cover element.

6. The method of claim 5, wherein the base body is positioned in the second mold before the second mixture is injected.

7. A valve body for a fluid injection valve, the valve body comprising:
   a longitudinal axis,
   a base body having a sidewall defining a recess extending through the base body in an axial direction,
   wherein the sidewall comprises a magnetic material and has at least one opening formed in the sidewall and opening into the recess, and
   a cover element is arranged to sealingly cover at least one opening, the cover element comprising a non-magnetic material.

8. The valve body of claim 7, wherein the cover element extends completely circumferentially around the base body.

9. The valve body of claim 7, wherein the cover element at least partially fills the at least one opening.

10. The valve body of claim 7, wherein the base body comprises a ferritic steel and the cover element comprises an austenitic steel.

11. The valve body of claim 7, wherein the valve body (a) has mirror symmetry with respect to a mirror plane comprising the longitudinal axis or (b) has an n-fold rotational symmetry with respect to the longitudinal axis.

12. A fluid injection valve comprising:
    a valve body comprising:
    a longitudinal axis,
    a base body having a sidewall defining a recess extending through the base body in an axial direction,
    wherein the sidewall comprises a magnetic material and has at least one opening formed in the sidewall and opening into the recess, and
    a cover element is arranged to sealingly cover at least one opening, the cover element comprising a non-magnetic material, and
    an electromagnetic actuator assembly comprising an armature arranged in the recess and axially overlapping the at least one opening.

13. The fluid injection valve of claim 12, wherein the cover element extends completely circumferentially around the base body.

14. The fluid injection valve of claim 12, wherein the cover element at least partially fills the at least one opening.

15. The fluid injection valve of claim 12, wherein the base body comprises a ferritic steel and the cover element comprises an austenitic steel.

16. The fluid injection valve of claim 12, wherein the valve body (a) has mirror symmetry with respect to a mirror plane comprising the longitudinal axis or (b) has an n-fold rotational symmetry with respect to the longitudinal axis.

* * * * *